United States Patent [19]

Ishii et al.

[11] Patent Number: 4,553,015

[45] Date of Patent: Nov. 12, 1985

[54] METHOD OF FABRICATING PISTON BY WELDING

[75] Inventors: Masami Ishii, Toyota; Fuminao Arai, Chiryu; Noriaki Hattori, Toyota; Junichi Mita, Kariya, all of Japan

[73] Assignee: Aisin Seiki Kabushiki Kaisha, Kariya, Japan

[21] Appl. No.: 559,925

[22] Filed: Dec. 9, 1983

[30] Foreign Application Priority Data

Dec. 26, 1982 [JP] Japan .................. 57-232688

[51] Int. Cl.⁴ .............................................. B23K 26/00
[52] U.S. Cl. ..................... 219/121 ED; 219/121 EC
[58] Field of Search .................. 219/121 LC, 121 LD, 219/121 EC, 121 ED

[56] References Cited

U.S. PATENT DOCUMENTS 3,319,536  5/1967  Kohl et al. ............... 219/121 EC X

FOREIGN PATENT DOCUMENTS 0146321  2/1981  Fed. Rep. of Germany ...... 219/121 EC Primary Examiner—C. L. Albritton
Attorney, Agent, or Firm—Oblon, Fisher, Spivak, McClelland & Maier

[57] ABSTRACT

A method of fabricating a piston for use in an automobile by welding. The head section and the skirt section of the piston are separately fabricated by casting such that these sections form the top wall portion of the piston when joined together and that the abutting surfaces of these sections form a portion of an oil circulating passage. Then, these sections are connected and welded together using an electron beam.

4 Claims, 8 Drawing Figures

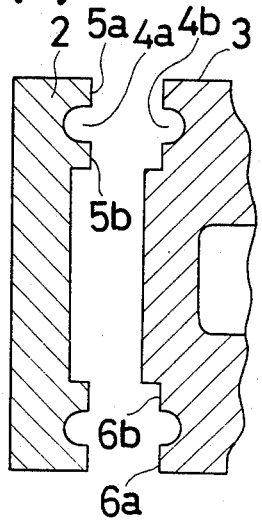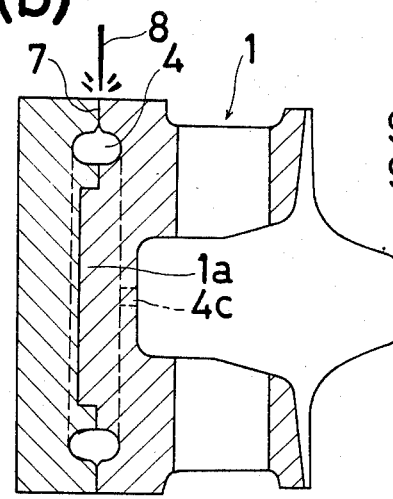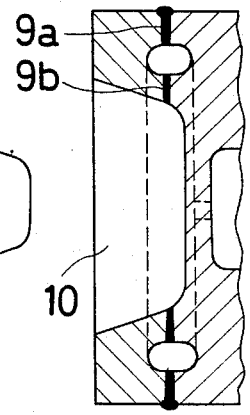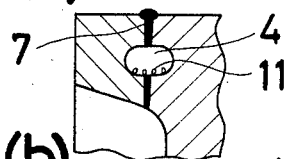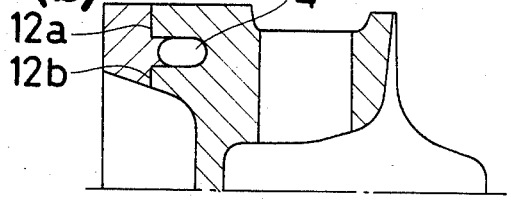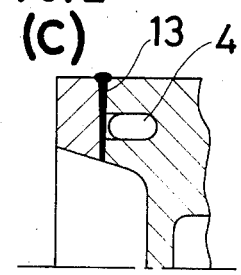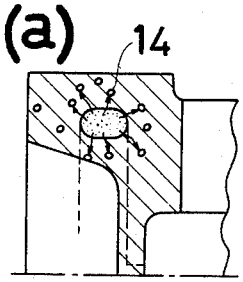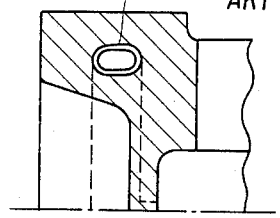

METHOD OF FABRICATING PISTON BY WELDING

FIELD OF THE INVENTION

The present invention relates to a method of joining together the separate head section and the skirt section of a piston by welding with certainty so as to fabricate the piston.

BACKGROUND OF THE INVENTION

Generally, the top wall portion of the head of a piston used in an automobile is provided with a passage through which oil is forced to circulate in order to cool the piston during operation. In forming the circulating passage in the head, the following methods have heretofore been employed; (1) A shell core is used when the piston is cast (FIG. 3 (a)). (2) An aluminum piping 16 is introduced into the mold when the piston is cast (FIG. 3(b)). However, according to the method (1) described above, generation of gas tends to result in cavities 14 being formed in the piston. Also, according to the method (2), it is quite difficult to position the piping 16.

SUMMARY OF THE INVENTION

It is the object of the present invention to provide a method of fabricating a piston having a circulating passage in its top wall portion without introducing the foregoing difficulties with the prior art methods, that is, without producing any cavity at all and without requiring any piping as a separate part.

Specifically, a piston is fabricated according to the present invention in the following manner. First, the head section and the skirt section of a piston are separately fabricated by casting such that each of these sections forms substantially one half of a circulating passage and that each section has an abutting portion. Then, these sections are caused to abut each other are welded together by electron beam welding to fully weld together the abutting surfaces placed deep within the piston, thereby completing the piston which has the oil circulating passage therein.

Since the top wall portion of the head is split into two members, when the electron beam welding operation is effected, sputtering atoms may deposit on the inner wall of the circulating passage. This often deteriorates circulation of oil. Accordingly, it is also possible to use such an electron beam in the vicinity of the passage. This welding making use of an electron beam has the following features: (1) If a space is formed in the piston so as to be in the path of the electron beam, an electron beam can pass through it. Hence, the welding is not affected by such a space. A circulating passage can be formed at the discretion of the operator by welding the abutting surfaces of a hole already finished. (2) A shell cell used will produce no gas. It is not required that a separate piping, or the like be imbedded in the mold. It is easy to form an excellent oil circulating passage. (3) If piercing welding using an electron beam generates a small amount of sputtering, all that is needed is simply to shift the welding position.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BRIEF DESCRIPTION OF THE DRAWINGS

FIGS. 1(a)–1(c) are cross-sectional views of the main portions of a piston to which the invention is applied, and Figures illustrating the conditions before, during, and after a welding, respectively;

FIGS. 2(a)–2(c) are views similar to FIGS. 1(a)–1(c), but illustrating another embodiment of the invention, FIG. 2(a) illustrating the manner in which sputtering atoms deposit on the inner wall of a passage, FIG. 2(b) and FIG. 2(c) illustrating the conditions before and after a welding, respectively; and FIGS. 3(a) and 3(b) are cross-sectional views of pistons, for illustrating conventional methods.

DETAILED DESCRIPTION OF THE PREFERRED EMBODIMENTS

Referring first to FIGS. 1(a)–1(c), a piston 1 has a top wall portion 1a, a head section 2, a skirt section 3, an elliptical oil circulating passage 4 divided into semi-circular portions 4a and 4b, abutting surfaces 5a, 5b, 6a, 6b which lie in the same plane, and an abutting portion 7. The welding operation is effected using an electron beam 8. Oil is fed into the passage 4 through an oil supply port 4c. Portions 9a and 9b have been welded using an electron beam. The piston is cut out as indicated by numeral 10 to make it lighter in weight. The elliptical passage 4 having dimensions of about 5×8 mm is formed in the top wall portion of the piston 1 having a diameter of about 65 mm. After welding, an electron beam welding is effected while rotating the piston under the following conditions:

acceleration voltage: 50 KV
beam current: 70–80 mA
welding velocity: 2m/min
pressure in welding chamber: 5×10 Torr
working distance: 200 mm
depth of penetration: 14 mm+midway space 5 mm
width of bead: 1.2 mm Referring next to FIGS. 2(a)–2(c), when the abutting portion 7 is welded by electron beam sputtering, sputtering atoms 11 deposit on the inner surface of the passage 4. In the case where the sputtering atoms 11 hinder the smooth flow of oil, electron beam welding may be effected at positions at short distances from a cross section of the passage 4, such as abutting surfaces 12a and 12b which lie in the same plane. The resultant condition is indicated by numeral 13. In this case, the welding sputtering atoms in no way deposit on the inner surface of the passage 4. Hence, it is assured that oil flows smoothly.

Obviously, numerous modifications and variations of the present invention are possible in light of the above teachings. It is therefore to be understood that within the scope of the appended claims, the invention may be practiced otherwise than as specifically described herein.

What is claimed is:

1. A method of fabricating a piston having an exterior portion by welding, the method comprising the steps of:
    fabricating the head section and the skirt section of the piston separately such that said sections form the top wall portion of the piston when joined together and the abutting surfaces of these sections form a portion of an oil circulating passage;

causing the abutting surfaces of the head section and the skirt section to abut each other to form the oil circulating passage; and welding together the abutting surfaces by using an electron beam such that inner end portions of the weld seams are exposed to said exterior portion of said piston.

2. A method of fabricating a piston by welding as set forth in claim 1, wherein the electron beam welding is effected at positions at short distances from a cross section of the circulating passage.

3. A method of fabricating a piston by welding as set forth in claim 1, wherein said abutting surfaces of said sections lie in the same plane.

4. A method of fabricating a piston by welding as set forth in claim 2, wherein said abutting surfaces of said sections lie in the same plane.

* * * * *